SHAFT ANGLE TO TIME INTERVAL CONVERTER

Filed Aug. 29, 1963 5 Sheets-Sheet 1

INVENTORS
Joseph A. Faulkner
Clifford J. Black
Robert G. Rolfe
BY [signature]
ATTORNEY

SHAFT ANGLE TO TIME INTERVAL CONVERTER

Filed Aug. 29, 1963 5 Sheets-Sheet 2

INVENTORS
Joseph A. Faulkner
Clifford J. Black
Robert G. Rolfe
BY [signature]
ATTORNEY

SHAFT ANGLE TO TIME INTERVAL CONVERTER

Filed Aug. 29, 1963 5 Sheets-Sheet 3

INVENTORS
Joseph A. Faulkner
Clifford J. Black
Robert G. Rolfe
BY [signature]
ATTORNEY INVENTORS
Joseph A. Faulkner
Clifford J. Black
Robert G. Rolfe
BY [signature]
ATTORNEY INVENTORS
Joseph A. Faulkner
Clifford J. Black
Robert G. Rolfe
BY [signature]
ATTORNEY United States Patent Office 3,274,585

Patented Sept. 20, 1966

3,274,585

SHAFT ANGLE TO TIME INTERVAL CONVERTER

Joseph A. Faulkner and Clifford J. Black, Takoma Park, and Robert G. Rolfe, Rockville, Md., assignors to the United States of America as represented by the Secretary of the Navy Filed Aug. 29, 1963, Ser. No. 305,564

8 Claims. (Cl. 340—347)

The invention described herein may be manufactured and used by or for the Government of the United States of America for governmental purposes without the payment of any royalties thereon or therefor.

This invention is directed to analog to digital converters and particularly to a unique method for digitally converting a shaft angle into a time interval and, conversely, converting a time interval into a shaft angle.

Prior art converters of the type described have employed shaft angle transducers including analog to digital converters in combination with gating circuitry which allowed a predetermined number of constant frequency pulses to pass therethrough and into a counter stage to provide a pulse output from the counter which was related to a shaft angle.

The present invention, while incorporating broadly the above idea of analog to digital conversion, employs binary counting circuitry including a chain of binary counters in combination with an analog to digital converter in a novel system wherein each binary counter is preset to a number determined by the digital state of the analog to digital converter hereinafter referred to as an ADC. The digital state of the ADC is representative of the shaft position within the ADC, and the number of count pulses required to generate an output from the binary chain of counters is therefore directly and linearly proportional to shaft position.

An object of this invention is to provide a highly reliable system for measuring shaft angle position as a time interval.

Another object of this invention is to provide a unique method for digitally converting a shaft angle into a time interval and, conversely, converting a time interval into a shaft angle.

A further object of this invention is to provide an analog to digital and digital to analog conversion system including a novel combination of fast reacting electronic circuit components including a binary counting circuit.

A still further object is the provision of novel pulsing circuitry for synchronizing the operation of the counter circuitry and an analog to digital converter.

Other objects and advantages will become apparent from reading the following disclosure in combination with the drawings wherein.

Figure 1:
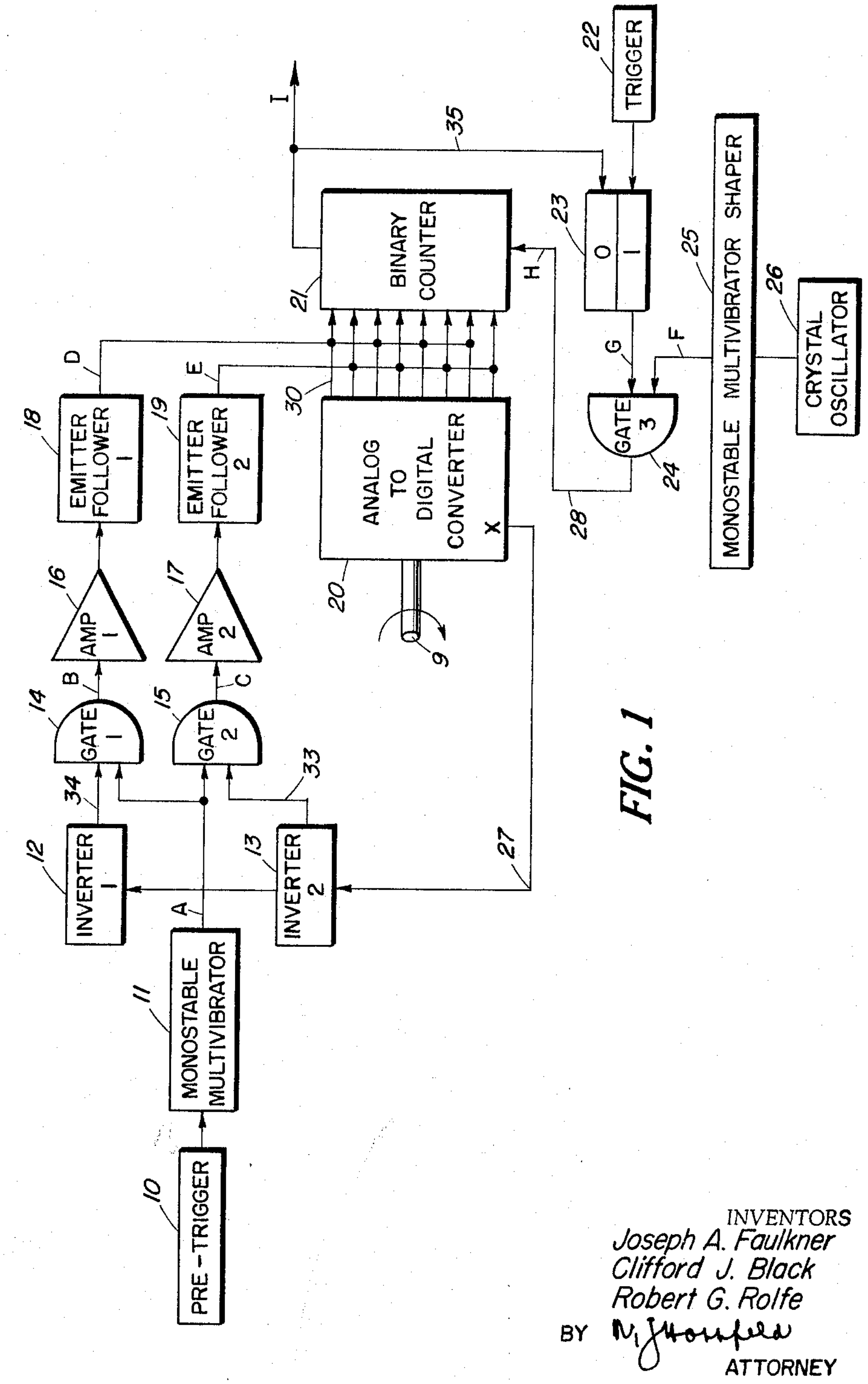
FIG. 1 is a block diagram of the invention.
Figure 2:
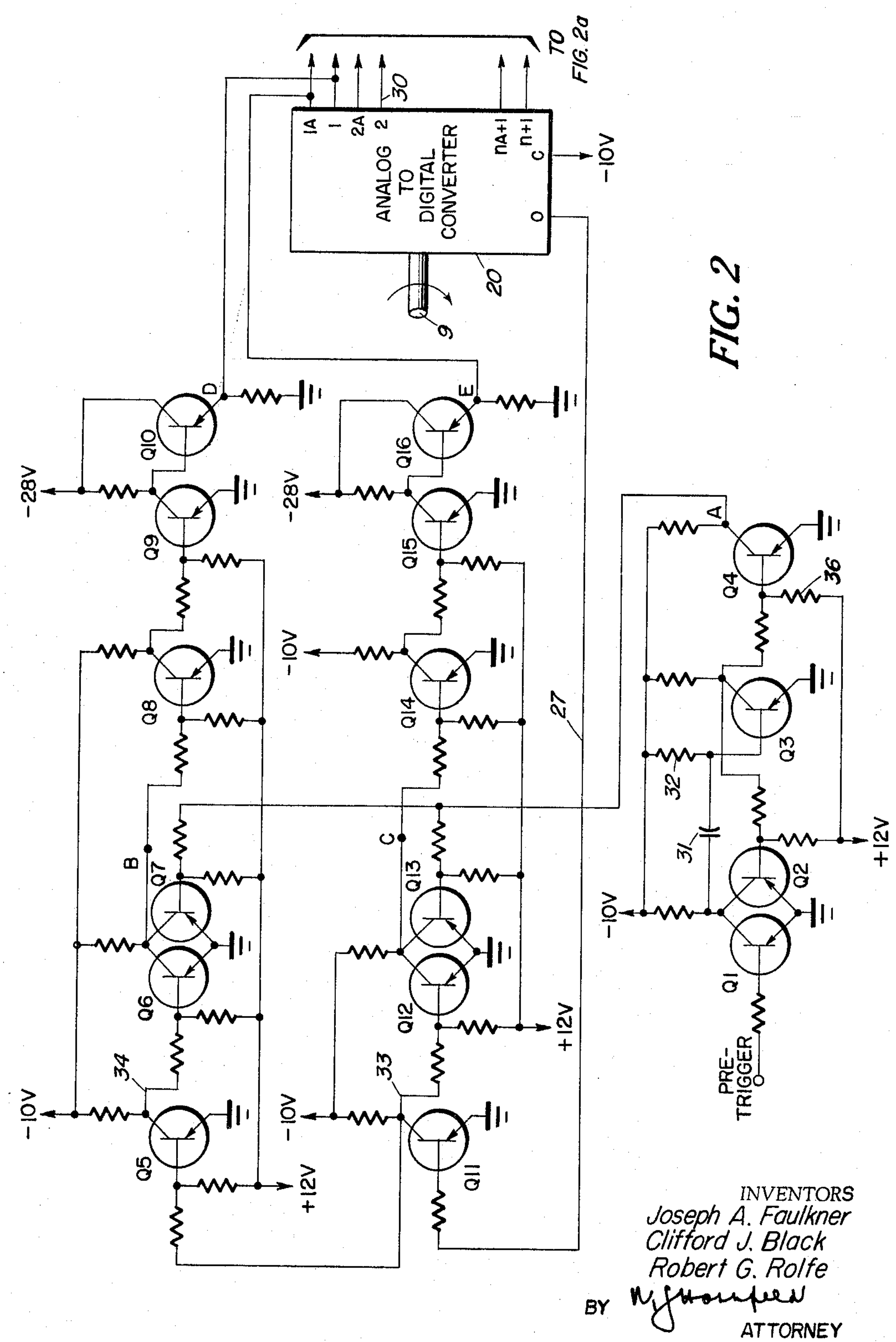
FIG. 2 is a detailed schematic diagram including the transistor circuitry for the various components of FIG. 1.
Figure 2A:
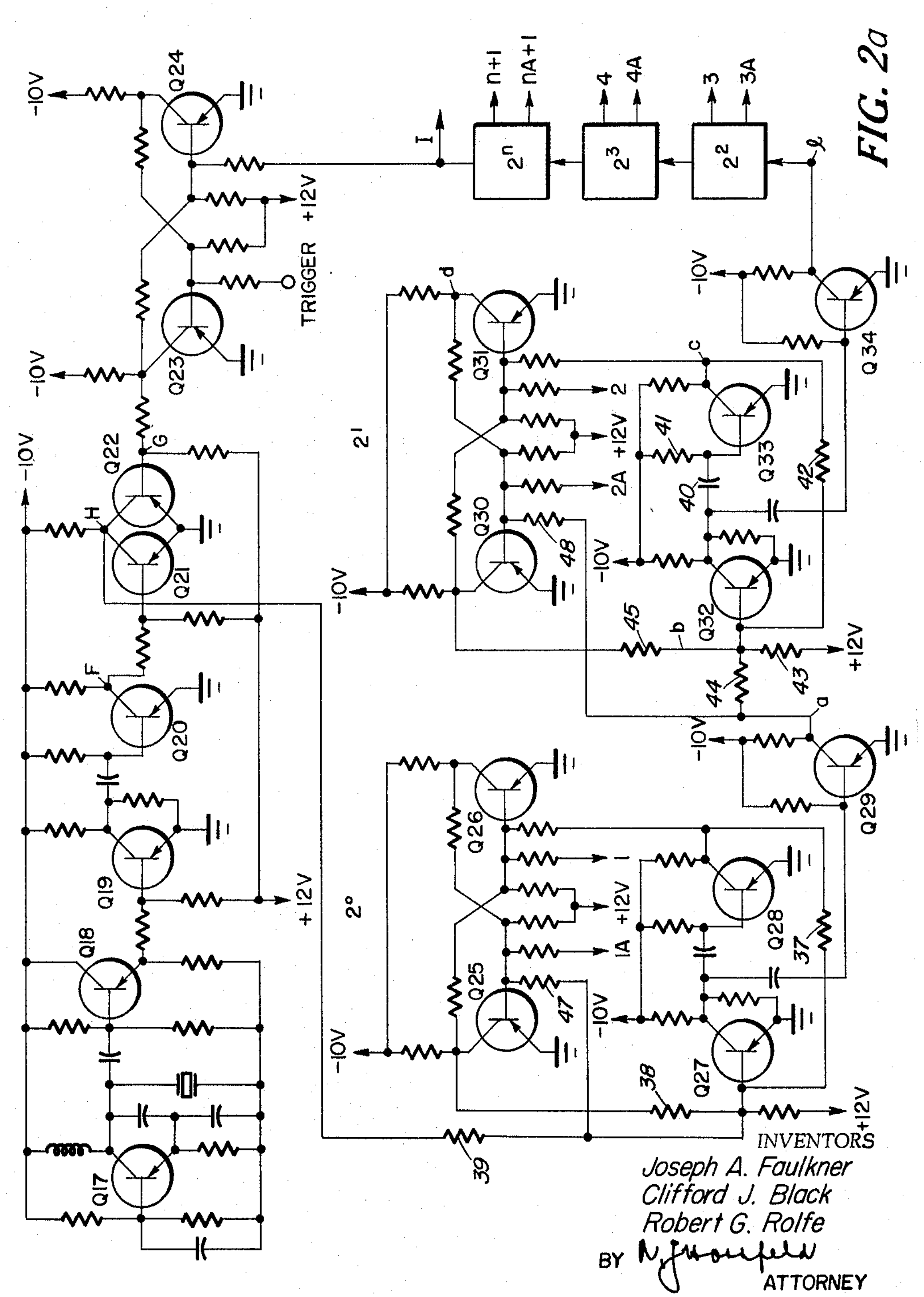
Figure 3:
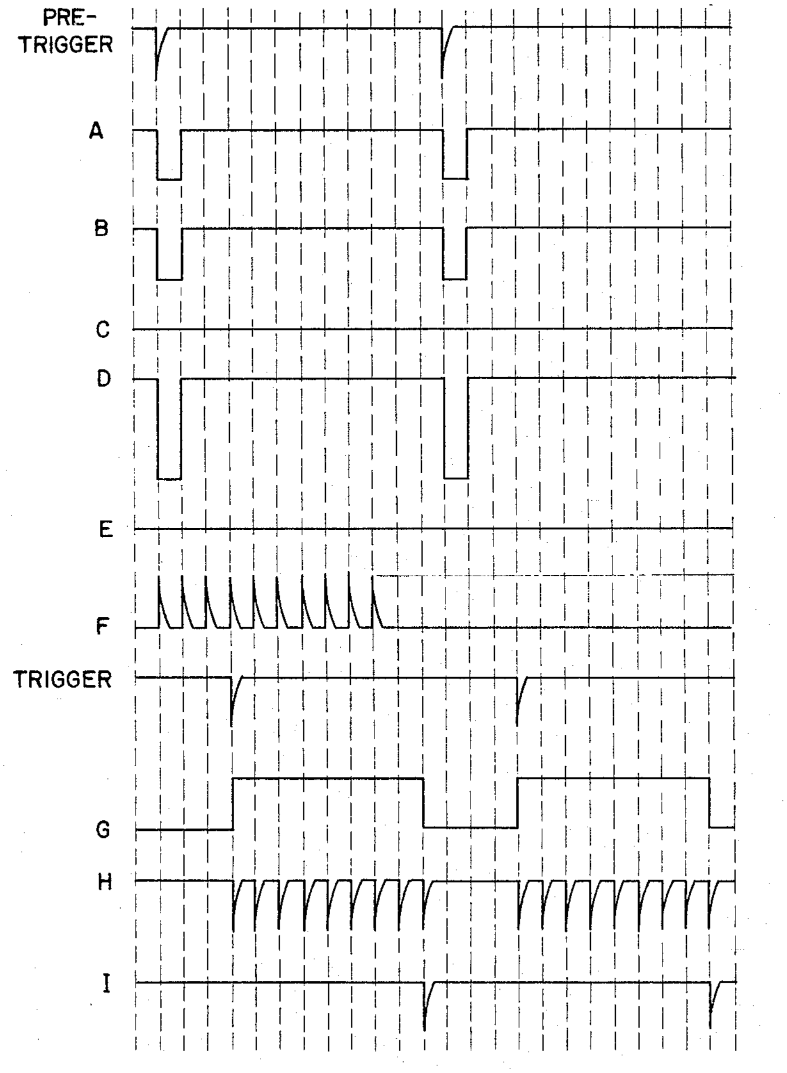
FIG. 3 is a wave-form diagram at various points in the block diagram of FIG. 1.

Referring now to FIGS. 1 and 2 and particularly to a pulsing circuitry and feedback loop 27 for an analog-to-digital converter ADC 20, the digital output from ADC 20 is connected via conductors 30 to the input of binary counter circuitry 21 to provide preset pulses thereto. The gating and pulsing circuitry for the ADC 20 includes a source 10 for generating a timing pulse for triggering a monostable multivibrator 11. As shown in FIG. 2, the monostable multivibrator 11 comprises transistors Q2 and Q3 with transistor Q3 combined in an amplifier circuit with transistor Q4 and transistor Q2 combined with Q1 to form an AND gate at the pretrigger input of the multivibrator circuit 11. The monostable multivibrator generates a 100-microsecond pulse which is applied to AND gates 14 and 15. AND gates 14 and 15 are shown as transistors Q6, Q7, Q12, and Q13, and include, in addition, inputs from inverters Q5 and Q11 via conductors 34 and 33, respectively. The input to the inverters 12 and 13 is a voltage which is fed back via conductor 27 from ADC 20 to the bases of Q5 and Q11. The voltages applied to the bases of Q11 and Q5 are 180° out of phase as are the voltages at the outputs of the inverters 12 and 13. Since these voltages are applied to the two gates 14 and 15 180° out of phase, the 100-microsecond preset pulse from the multivibrator 11 is allowed to pass one gate while the other gate will block it. This alternating arrangement insures an unambiguous output from the ADC to the binary counter chain preset inputs 1, 1A, 2, 2A, etc. Transistor amplifiers 16 and 17 are connected to the respective outputs of gates 14 and 15 and include transistors Q8, Q9 and transistors Q14 and Q15. The two transistors of each amplifier stage 16 and 17 form a simple device for changing voltage levels and are operated full on or full off, functioning as switches. The amplifiers 16, 17 boost the preset pulse from multivibrator 11 to overcome the voltage attenuating effect of the series connected steering diodes (not shown) inside the ADC. The emitter followers 18 and 19 comprising the transistors Q10 and Q16 serve to match the impedance of the amplifiers 16 and 17 to the relatively low impedance of the parallel counter preset points 1, 1A, 2, 2A, etc. The generated rectangular pulse at the output of the emitter followers 18 and 19 and represented at D in FIG. 3 is introduced into the ADC at 1 and is routed through binary programmed switches in the ADC to associated stages in the binary counter. By this procedure the binary counter is preset to the binary number at the output of the ADC 1, 1A, 2, 2A, etc. and determined by the position of the ADC shaft 9.

A monostable, multivibrator-shaper unit 25 is triggered by a crystal oscillator 26 and supplies continuous shaped pulses to one input of the AND gate 24 comprising transistors Q21 and Q22. The crystal oscillator includes transistor Q17 and output transistor Q18 which is connected to input of Q19 of the monostable multivibrator-shaper unit Q19 and Q20. During the preset period described above, AND gate 24 has been gated off by a flip-flop circuit 23 comprising transistors Q23 and Q24. The flip-flop 23 is connected to an externally generated trigger pulse source 22 which may be energized to change the state of flip-flop 23. This change will gate on AND gate 24 and allow the shaped-pulses at the output F of shaper 25 to appear at the input H of the first counter stage $2^0$ and applied across resistors 39 and 47. The output G taken from the collector of transistor Q23 of the flip-flop circuit 23 and the trigger pulse applied to the base of transistor Q23 are shown in the wave-form diagram of FIG. 3, and the pulses applied through resistors 38 and 47 to the bases of transistors Q27 and Q25 in counter stage $2^0$ are at the same frequency. The frequency of the trigger pulses applied to flip-flop circuit 23 is the same as that of the pre-trigger pulses applied to the base of transistor Q1 and the input of the monostable multivibrator 11. As will be discussed hereinafter, the signal which is fed back via conductor 35 to the base at transistor Q24 changes the flip-flop 23 back to its original state, gating off input pulses to the counter stage $2^0$ in preparation for a preset and counting cycle. A pulse at point I will appear when the number of input pulses to the initial stage $2^0$ of the counter chain is equal to the complement of the number preset into the chain, plus one.

Figure 5:
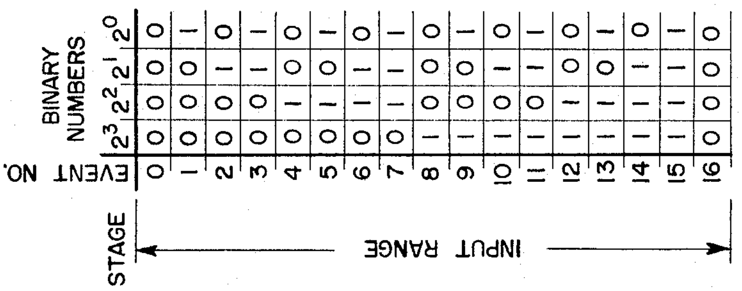
FIG. 5 is a truth table indicating the changes in the internal state of each stage of the four stage counter circuit of FIG. 2.
Figure 4:
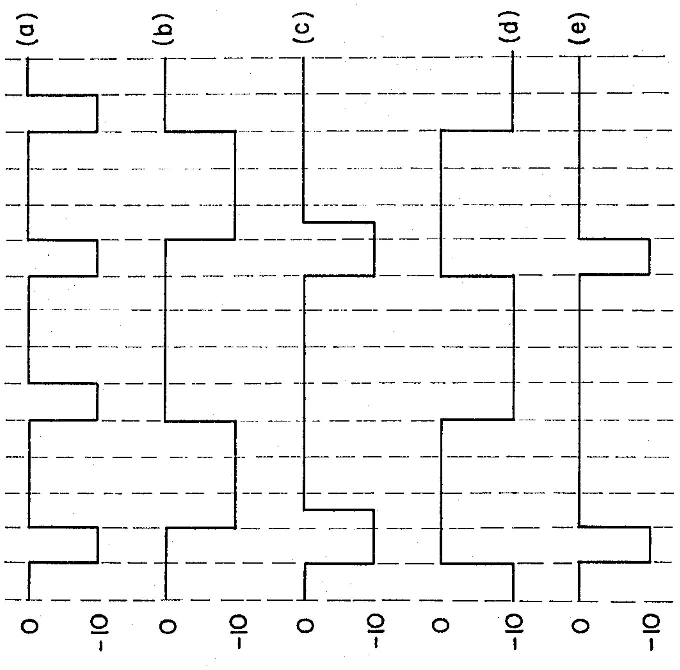
FIG. 4 is a wave-form diagram of the various waveforms located at different points in the binary counter circuitry of FIG. 2.

Each of the counter stages in the binary counter chain 21 comprises a flip-flop circuit and a double monostable multivibrator such as shown in counter $2^0$. The flip-flop circuit in counter stage $2^0$ comprises transistor Q25, and Q26, and has an output connection from Q25 to the base of transistor Q27. The base of transistor Q27 has in addition, an input from AND gate 24 or point H in FIG. 2. The truth table of FIG. 5 shows changes in internal state of each stage of a four stage counter when input pulses are applied to the initial $2^0$ counter stage. Each stage changes its state when it receives an input pulse and generates an output when changing from state 1 to state 0. When the first stage $2^0$ of the binary counter starts counting from 0 (binary 0000) sixteen input pulses are required to generate output pulse from the $2^3$ stage.

If the decimal number 6 (binary 0110) is preset into the counter chain before applying a pulse from point H to the base of transistor Q27, then 10 (binary 1010) input pulses will be required to generate an output at I. The two numbers are related in a complementary manner; 1010 is the complement, plus one, of 0110. (1001+1 =1010.) By controlling the conduction state of each bistable flip-flop circuit, e.g., Q25, Q26, in each stage of the binary counter 21 by supplying the preset pulses from the ADC to terminals 1, 1A, 2, 2A, etc., the complementary preset number may be varied. A general statement can be made that the number of input pulses required to generate an output pulse from a binary counter stage is equal to the complement of the preset number plus one, hereinafter referred to as the complementary preset number. From this it can be concluded that the time interval between starting constant frequency pulses into the initial counter stage $2^0$ of the binary counter and receiving an output pulse from the last stage $2^n$ at point I is directly and linearly related to the preset number.

Referring now to binary counter stage $2^1$, transistors Q30, Q31 are cross-coupled in an Eccles-Jordan flip-flop. Except during transition, one transistor has full on and the other full off. To cause the circuit to change states, a negative voltage, usually a pulse, must be applied to the base of the off transistor. A negative pulse applied to the base of the on transistor will have no effect. Terminals 2 and 2A have been connected to preset terminals 2 and 2A in the ADC and it will be assumed for discussion purposes that transistor Q30 is conducting and transistor Q31 is off.

Transistors Q32, Q33, and Q34 are connected to form a double monostable multivibrator, and output pulses of different widths will appear at points *c* and *e* with their leading edges occurring at the same time. The preset pulses from ADC 20 are applied to terminals 2 and 2A of the flip-flop Q30, Q31, and the switching rate of Q30, Q31 is determined by the pulse count from the preceding stage $2^0$ at terminal *a*. With Q30 conducting and point B at ground, an input pulse at *a* from the preceding stage $2^0$ to the double monostable multivibrator Q32, Q33, Q34 will produce output pulses at *c* and *e*. The pulse at point *c*, being longer than the input pulse from the preceding stage $2^0$, is applied to the base of transistor Q31 and causes the flip-flop to change states. Transistor Q30 becomes nonconductive and the −10 volts potential at the collector of Q30 is reflected to the base of transistor Q32 to maintain transistor Q32 conducting. Thus the next succeeding pulse at *a* from the collector of transistor Q29 in stage $2^0$ will have no effect on the monostable multivibrator circuit. This last named pulse will, however, be applied to the base of Q30 via resistor 48 to switch Q30 into conduction to condition stage $2^1$ for the next pulse from stage $2^0$. This action is necessary in the divide-by-two counter so that every other input pulse from the preceding stage along conductor *a* is effective to produce an output pulse at *c* and *e*. Thus with four counter stages, $2^0$, $2^1$, $2^2$, and $2^3$, sixteen input pulses are required at point H and applied to the base of transistor Q27 for an output pulse to appear at the output of stage $2^3$ with no binary number preset into the counter chain. The output pulse is fed back via conductor 35 to change the state of the flip-flop 23 including transistors Q23, Q24.

The monostable multivibrator employed in each of the counter stages is of the conventional type. With transistor Q33 originally conducting and point *c* at ground potential in which Q30, initial conduction of Q32 causes a positive going signal to be reflected through capacitor 40 to the base of Q33. Regeneration supplied by resistor 42 results in a rapid change of state of both transistors; it drives transistor Q33 into cutoff and Q32 into saturation. Upon discharge of capacitor 40 through resistance 41, the base of Q33 is again driven negative and the state of conduction to the two transistors once again reverses with the switching time dependent upon the RC time constant of capacitor 40 and resistance 41.

All transistors used in circuit of FIG. 2 were 2N501. Resistor 43, through which the positive 12 v. bias is applied to the base of transistor Q32, is 33K and resistors 44, 45, and 48 are 2.2K. Resistor 46 is 820 ohms. Therefore either the −10 volts applied from the collector of transistor Q30 or the −10 volts applied from the collector of transistor Q29 when either are nonconducting is sufficient to overcome the positive 12 v. bias applied across resistor 43 and initiate conduction of transistor Q32.

The monostable multivibrator action as described with reference to transistors Q32 and Q33 is likewise present in the monostable multivibrator circuit 11 including transistors Q2 and Q3 and also in the monostable multivibrator shaper circuit 25 including transistors Q19 and Q20.

In summary, the ADC 20 programs switch positions in a binary code having a readout directly and linearly proportional to the input shaft angle. The switches program the preset pulses originating at 11 to the binary counter 21, presetting it to the same state as the ADC. The number of count pulses required to generate an output from the binary chain is therefore directly and linearly proportional to the ADC shaft position. The count frequency is stable and accurately known, and the number of counts represent a time interval. Therefore the generated time interval is directly and linearly proportional to the shaft position 9 of the ADC 20.

The generated time interval could be applied to the input of an analog computer in time interval to shaft angle conversion if desired. In general, the method used to accomplish this is to generate and display two gates or voltage pedestals occurring at digitally measured time intervals such as outputs from the last binary counter stage $2^n$. In tracking a target, the operator positions these gates over target signatures and in so doing positions the shafts. These shafts drive vernistats which may feed an analog computer with 400 cycle voltages linearly proportional to the shaft positions.

Various modifications are contemplated and may obviously be resorted to by those skilled in the art without departing from the invention, as hereinafter defined by the appended claims, as only a preferred embodiment thereof has been disclosed.

What is claimed is:

1. A system for converting an angle of shaft rotation into a time interval between output pulses comprising:

an analog-to-digital converter coupled to said shaft, a binary counter circuit, means connecting the output of said analog-to-digital converter to said binary counter circuit for presetting said binary counter circuit at a value commensurate with shaft rotation therein, and a first source of timing pulses connected to said binary counting circuit whereby the count rate of said binary counter circuit is controlled by the spacing of said timing pulses applied thereto and the binary number preset into said binary counter from said analog-to-digital converter.

2. The combination of claim 1 wherein;

said first source of timing pulses includes oscillator means, an AND gate interconnecting said oscillator means and said binary counter circuit, a bi-stable multivibrator coupled between the output of said binary counter circuit and said AND gate for receiving a feedback signal from said binary counter circuit, and means for triggering said bi-stable multivibrator to render said AND gate conductive for passing timing pulses from said oscillator means to the input of said binary counter circuit.

3. The combination of claim 2 which further includes;

a second source of timing pulses applied to said analog-to-digital converter for modification therein in accordance with said shaft angular rotation, a plurality of outputs of said analog-to-digital converter coupled to said binary counter circuit for presetting said binary counter circuit to provide an output signal upon receipt of a predetermined number of timing pulses from said first source of timing pulses.

4. The combination of claim 3 wherein said binary counter circuit includes;

a plurality of cascaded counter stages, said stages each having a flip-flop circuit coupled to respective ones of said plurality of outputs from said analog-to-digital converter, said stages each having a monostable multivibrator connected to each of said flip-flop circuits, said plurality of outputs from said analog-to-digital converter being applied to said flip-flops to render said monostable multivibrator circuits within each counter stage operable to pass an output pulse to the next counter stage upon receipt of a predetermined number of pulses from a preceding counter stage and derived from said first source of timing pulses.

5. A system for converting shaft angle into a time interval comprising;

a plurality of cascaded binary counter stages connected in a binary chain, a first source of timing pulses connected at the input of said binary chain, an analog-to-digital converter having a second source of timing pulses connected to the input thereof for modification therein in accordance with the angular rotation of the shaft associated with said analog-to-digital converter, means connecting said analog-to-digital converter to each of said binary counters for presetting the conduction state of said counters in accordance with said shaft angular position, and means connected to the output of the last counter stage of said binary chain for conducting an output pulse after the application of a predetermined number of input pulses to the first counter stage from said first timing pulse source, and switching means for feeding back said output pulse to the input of said initial counter stage of said binary chain for rendering said binary chain nonconductive.

6. A system for converting shaft angle into a time interval between voltage pulses comprising;

an analog-to-digital converter having a shaft coupled thereto, a source of preset pulses connected to said analog-to-digital converter for modification therein in accordance with the angular position of said shaft, a plurality of binary counter stages connected in cascade to form a binary chain, a source of timing pulses connected to the input of said binary chain, means coupling the output of said analog-to-digital converter to said binary chain to preset the conduction state of said counter stages to a value commensurate with preset pulses modified in said analog-to-digital converter whereby an output pulse will appear at the output of the last counter stage of said binary chain after a predetermined number of input pulses have been applied to the input of said binary chain from said source of timing pulses.

7. The combination of claim 6 wherein each of said binary counter stages comprises;

a monostable multivibrator circuit, a bistable flip-flop circuit connected between said monostable multivibrator circuit and said output of said analog-to-digital converter, conductive means connecting the output of each monostable-multivibrator circuit to the monostable-multivibrator circuit and bistable flip-flop within a next succeeding counter stage in said binary chain, and means connected between the final and initial counter stages of said binary chain for rendering said binary chain nonconductive upon receipt of an output pulse from said first counter stage.

8. The combination of claim 7 wherein said source of timing pulses includes;

an oscillator, an AND gate interconnecting said oscillator and said input of said binary chain, said means connected between said final and initial counter stages including a bistable multivibrator for switching said AND gate into conduction, said monostable multivibrator circuit including a pair of output transistors connected in parallel to form a double-monostable multivibrator circuit, one of said pair of transistors having its output connected to said bistable flip-flop within the same counter stage and the other of said pair of transistors having its output coupled to the next succeeding counter stage.

References Cited by the Examiner

UNITED STATES PATENTS

| | | | |
|---|---|---|---|
| 2,894,254 | 7/1959 | Mork | 340—347 |
| 2,907,021 | 9/1959 | Woods | 340—347 |
| 2,941,196 | 6/1960 | Raynsford et al. | 340—347 |
| 3,042,911 | 7/1962 | Paradise et al. | 340—347 |

MAYNARD R. WILBUR, *Primary Examiner.*

MALCOLM A. MORRISON, DARYL W. COOK, *Examiners.*

K. R. STEVENS, *Assistant Examiner.*